US012715125B2

(12) United States Patent
Gaschler et al.

(10) Patent No.: US 12,715,125 B2
(45) Date of Patent: Aug. 25, 2026

(54) ERROR HANDLING FOR REAL-TIME ROBOTIC CONTROL SYSTEMS

(71) Applicant: Intrinsic Innovation LLC, Mountain View, CA (US)

(72) Inventors: Andre Gaschler, Munich (DE); Nils Berg, Karlsruhe (DE)

(73) Assignee: Intrinsic Innovation LLC, Mountain View, CA (US)

( * ) Notice: Subject to any disclaimer, the term of this patent is extended or adjusted under 35 U.S.C. 154(b) by 95 days.

(21) Appl. No.: 18/390,661

(22) Filed: Dec. 20, 2023

(65) Prior Publication Data

US 2024/0217098 A1 Jul. 4, 2024

Related U.S. Application Data

(60) Provisional application No. 63/435,901, filed on Dec. 29, 2022.

(51) Int. Cl.
*B25J 9/16* (2006.01)

(52) U.S. Cl.
CPC .......... *B25J 9/1653* (2013.01); *B25J 9/1674* (2013.01)

(58) Field of Classification Search
CPC .............................. B25J 9/1653; B25J 9/1674
See application file for complete search history.

(56) References Cited

U.S. PATENT DOCUMENTS 6,944,584 B1 * 9/2005 Tenney .............. G05B 19/0426 703/22
2007/0174653 A1 * 7/2007 Berman ........... G01N 35/00623 714/2

* cited by examiner

*Primary Examiner* — Dylan M Katz
(74) *Attorney, Agent, or Firm* — Fish & Richardson P.C.

(57) ABSTRACT

Methods, systems, and apparatus, including computer programs encoded on computer storage media, for handling errors in a real-time robotic control system. One of the methods include: receiving a definition of a custom real-time action to be performed in real-time by the real-time robotic control system to control a robot; executing the custom real-time action according to the definition at each tick of a real-time control cycle to effectuate real-time operation of the robot, including: determining, by the custom real-time action, that a first error condition is satisfied, in response, returning a first error object from the custom real-time action to a real-time session which invoked the custom real-time action, receiving, by the real-time session, the first error object generated by the custom real-time action, and in response, executing a first recovery process.

23 Claims, 4 Drawing Sheets

100
User Device 190
Real-Time Robotic Control System 150
Application Layer 122a
Custom Real-time Action 123
Control Layer 122b
Real-time Hardware Abstraction Layer 122c
Real-time Commands 155a
Observations 175a
Real-time Commands 155n
Observations 175n
Operating Environment 170
Robot A 172a
Sensor A 171a
Robot N 172n
Sensor N 171n

ERROR HANDLING FOR REAL-TIME ROBOTIC CONTROL SYSTEMS

CROSS-REFERENCE TO RELATED APPLICATIONS

This application claims priority to U.S. Provisional Application No. 63/435,901, filed on Dec. 29, 2022. The disclosure of the prior application is considered part of and is incorporated by reference in the disclosure of this application.

BACKGROUND

This specification relates to frameworks for software control systems.

Real-time software control systems are software systems that must execute within strict timing requirements to achieve normal operation. The timing requirements often specify that certain actions must be executed or outputs must be generated within a particular time window in order for the system to avoid entering a fault state. In the fault state, the system can halt execution or take some other action that interrupts normal operation. Such real-time software control systems are often used to control physical machines that have high precision and timing requirements. As one example, a workcell of industrial robots can be controlled by a real-time software control system that requires each robot to repeatedly receive commands at a certain frequency, e.g., 1, 10, or 100 kHz. If one of the robots does not receive a command during one of the periodic time windows, the robot can enter a fault state by halting its operation or by automatically executing a recovery procedure to return to a maintenance position. In this specification, a workcell is the physical environment in which a robot will operate. Workcells have particular physical properties, e.g., physical dimensions that impose constraints on how robots can move within the workcell.

While executing an action, errors may occur. These errors may occur because of runtime errors, and errors may be introduced by the source code itself. Although some software control systems may be able to implement mechanisms for handling/recovering from certain errors, these software control systems do not actively identify error conditions and much less report or forward such errors. Moreover, rarely do these systems provide enough useful information for a user to understand the error and resolve the root cause. This is particularly problematic when dealing with complex, real-time software control systems in which multiple layers of software modules collaborate with one another to execute within the strict timing requirements. For example, an error may be detected many steps after the root error actually occurred.

SUMMARY

This specification describes how a system implementing a real-time robotic control framework that provides a unified platform for achieving custom real-time control capabilities can handle errors or other exceptions during the real-time operations of the system. In this specification, real-time control being custom means that a user can specify how robots in an operating environment should act or react at each tick of a real-time control cycle. For example, the user can initiate the execution of custom real-time control by providing custom real-time control code to a real-time robotic control system which can then be executed (e.g., after compilation) by the system to drive the robots to effectuate a custom real-time action. A bug, e.g., an error, flow, mistake, failure, fault, or otherwise undocumented feature, in the custom code can prevent the custom control logic from being executed as intended, thereby jeopardizing normal robot operation.

Under the design of the disclosed real-time robotic control framework, after a bug is encountered at any tick during execution of a custom real-time action, an error object may be returned, and the system will, in real-time within the same tick, halt the execution of the custom real-time action and execute a recovery process to hold the robot at a designated recovery position. The system could also display a stack trace, i.e., a report of the active stack frames at a certain point during execution of the custom real-time action, and/or error messages to assist in the debugging process to identify problems with the custom code.

In this specification, a framework is a software system that allows a user to provide higher level program definitions while implementing the lower level control functionality of a real-time robotics system. In this specification, the operating environment includes multiple subsystems, each of which can include one or more real-time robots, one or more computing devices having software or hardware modules that support the operation of the robots, or both. The framework provides mechanisms for bridging, communication, or coordination between the multiple systems, including forwarding control parameters from a robot application system, providing sensor measurements to a real-time robotic control system for use in computing the custom action, and receiving hardware control inputs computed for the custom action from the real-time robotic control system, all while maintaining the tight timing constraints of the real-time robot control system, e.g., at the order of one millisecond.

Particular embodiments of the subject matter described in this specification can be implemented so as to realize one or more of the following advantages. Performance and reliability of a real-time robotic control system can be improved when controlling the robots in accordance with custom real-time control code provided by developers. In the event of an error or fault in the execution of a custom real-time action, the disclosed system can perform a timely response to the error, e.g., by halting the execution and holding the robot at a designated recovery position within the same tick in which the error was encountered. This can avoid damage to or other unnecessary wear and tear on the operating environment or the robots themselves.

The disclosed control system thus facilitates more effective development of custom actions and reactions to be executed by the robots that fit the needs of particular robotic tasks because the error handling mechanism can allow custom code to be tested under a wider range of situations, including those that occur rarely and those that would previously considered to be unsafe to run with an actual robot. Moreover, returning error objects based on developer specified error conditions may permit the developer to control a manner in which different types of errors are identified and/or processed, and avoid unnecessary disruption to the execution of the custom real-time action.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
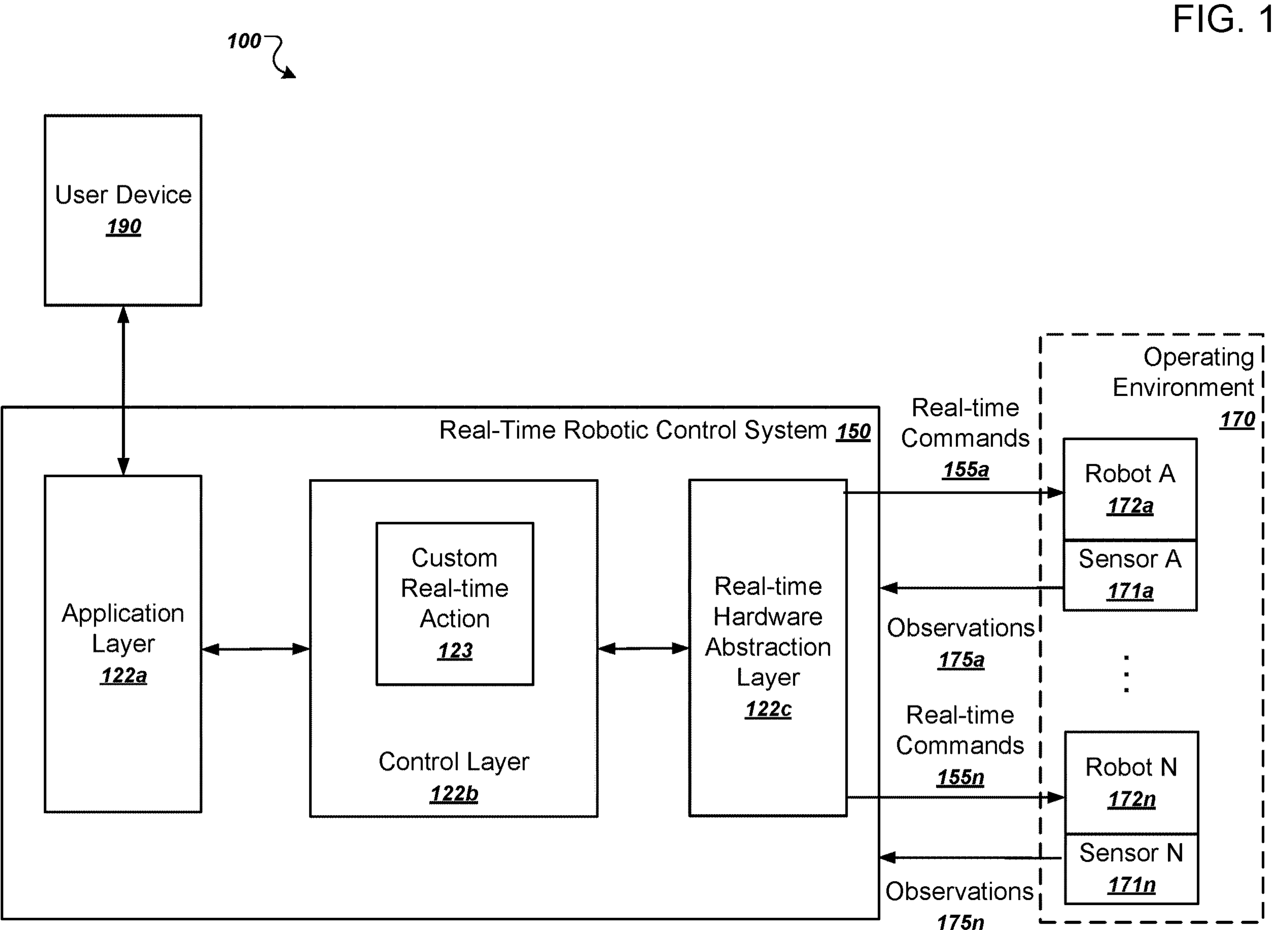
FIG. 1 is a diagram of an example system.

FIG. 1 is a diagram of an example system 100. The system 100 includes a real-time robotic control system 150 to drive multiple robots 172*a-n* in an operating environment 170. The system 100 includes a number of functional components that can each be implemented as computer programs installed on one or more computers in one or more locations that are coupled to each other through any appropriate communications network, e.g., an intranet or the Internet, or combination of networks.

The system 100 is an example of a system that can implement the real-time robotic control framework as described in this specification. In particular, the system 100 can provide a unified framework that allows users to achieve multiple different types of custom real-time control. In this specification, a robotic control system being described as being real-time means that it is required to execute within strict timing requirements to achieve normal operation. The timing requirements specify that certain actions must be executed or outputs must be generated within a particular time window in order for the system to avoid entering a fault state. For brevity, each time window may be referred to as a tick or a control tick. In the fault state, after a tick has elapsed without completing its required computations or actions, the system can halt execution or take some other action that interrupts normal operation, e.g., returning the robots to a starting pose or a fault pose.

Operations, e.g., processing steps for completing a task or function, in a non-real-time system are known as non-deterministic operations, which are not required to complete within a given tick to be successful. In contrast, a real-time system requires deterministic operations, which are required to occur every tick. In non-real-time and real-time systems, a scheduler may be utilized to determine the amount of resources, e.g., network bandwidth, memory, processor cycles, or a combination thereof, that an action is allotted for execution. If no or inadequate resources are allocated, the real-time system can also enter the fault state.

To control the robots 170*a-n* in the operating environment 170, the real-time robotic control system 150 provides commands, e.g., commands 155*a-n*, to be executed by one or more robots, e.g., robots 172*a-n*, in the operating environment 170. In order to compute the commands 155, the real-time robotic control system 150 consumes real-time observations 175*a-n* made by one or more sensors 171*a-n* gathering data within the operating environment 170. As illustrated in FIG. 1, each sensor 171 is coupled to a respective robot 172. However, the sensors need not have a one-to-one correspondence with robots and need not be coupled to the robots. In fact, each robot can have multiple sensors, and the sensors can be mounted on stationary or movable surfaces in the operating environment 170. Any suitable sensors 171 can be used, such as distance sensors, force sensors, torque sensors, cameras, to name just a few examples.

Generally, the real-time robotic control system 150 can provide commands through a control stack 122 that handles providing real-time control commands 155*a-n* to the robots 172*a-n*. The control stack 122 can be implemented as a software stack that is at least partially hardware-agnostic. In other words, in some implementations the software stack can accept, as input, commands generated by the control system 150 without requiring the commands to relate specifically to a particular model of robot or to a particular robotic component.

The control stack 122 includes multiple levels, with each level having one or more corresponding software modules. In FIG. 1, the lowest level is the real-time hardware abstraction layer 122*c* which executes within strict real-time requirements, e.g., by providing a command at a first, fixed rate, e.g., every 1, 5, 10, or 20 milliseconds, and the highest level is the application layer 122*a* which executes within non-real-time requirements, e.g., by providing a command at second, lower rate, which may sometimes be a varying rate or a rate that is sporadic, or both. Interposed between the non-real-time application layer 122*a* and the real-time hardware abstraction layer 122*c* is a control layer 122*b*, which handles bridging the boundary between the non-real-time commands generated by upper-level software modules in the control stack 122 and the real-time commands generated by the lower-level software modules in the control stack 122. More details of the control stack 122 are described in commonly owned U.S. patent application Ser. No. 17/246,082, which is herein incorporated by reference.

The control layer 122*b* serves as a bridging module in the control stack that translates each non-real-time command into data that can be consumed by real-time controllers that are responsible for generating low-level real-time commands. Such low-level real-time commands can, for example, relate to the actual levels of electrical current to be applied to robot motors and actuators at each point in time in order to effectuate the movements specified by the command.

The control layer 122*b* implements real-time software modules that facilitate various types of custom real-time control, including custom real-time action and custom real-time reaction. In this specification, an action refers to a motion having precomputed motion parameters, such as moving a tool on a robot arm from point A to point B. A reaction refers to a real-time switch between actions due to certain specified conditions, which can include sensor data that is updated in real-time.

A user of the system 100 can initiate the execution of custom real-time control by providing custom real-time control information to the real-time robotic control system 150. For example, a user can use a user device 190 to provide custom real-time control information to the application layer 122*a*. For example, through an integrated development environment (IDE) executed in the user device 190, the user can write code that defines the control logic for one or more robots to perform a custom real-time action 123. In some examples, the user code can be expressed in high-level programming languages, e.g., Object Oriented Programming (OOP) languages, including C++, Python, Lua, and Go.

In many cases where the custom real-time action 123 is a sensor-based action that uses sensor values in real-time, the logical (i.e., application or program code) implementation of the action 123 will become intrinsically complex owing to the computation of robot kinematics and dynamics and the internal states of the action, as well as the need to read from and control multiple hardware modules of the system during the execution of the action 123. One example of such an action is an admittance control action with end-of-arm force-torque sensing and a position-controlled robot arm. Another example of such an action is a trajectory following action to control a robot arm to traverse a path along a surface of an object while maintaining a distance to the surface based on sensor values obtained in real-time using a distance sensor.

A powerful feature of the framework described in this specification is the improved capability to handle errors that may occur during execution of the custom real-time actions. Error handling includes handling errors of different sources. In some cases, errors may be introduced by the custom real-time control code itself; when the real-time robotic control system 150 encounters such an error, an error handling and recovery process will always be triggered. For example, when designing software logic to be applicable for the custom real-time action 123, a user may inadvertently omit certain edge or corner cases or other unexpected situations which, when encountered during execution in real-world, will cause an error. As another example, the custom real-time control code may include function calls to some dependent code, e.g., a sensor hardware abstraction layer (HAL) software module or an inverse kinematics solver in a robotics library, and an exception may occur in the dependency, e.g., a sensor value not available, or an inverse kinematics algorithm failing for numerical corner cases (e.g., in cases where either no solution or an infinite number of solutions exist when computing the inverse mapping from Cartesian space to joint space).

In these cases, the error handling and recovery process performed by the real-time robotic control system 150 can include halting the execution of the custom real-time action and holding each of one or more robotic components of the robots 172*a-n* in the operating environment 170 at a designated recovery position. In some of these cases, the designated recovery position can be whatever position the robotic component was at when the error occurred. In some of these cases, the error handling and recovery process can additionally include generating and displaying, e.g., on the user device 190, a stack trace and/or error messages to assist in the debugging process to identify problems with the custom code.

In some other cases, errors may occur because of runtime errors; when the real-time robotic control system 150 encounters such an error, an error handling and recovery process may or may not be triggered. For example, if a segmentation fault, a deadlock or blocking code bug, or another real-time violation is encountered, instead of suspending the real-time operation of the system, the real-time robotic control system 150 can either wait for the pending execution to complete despite the error, or attempt a re-run and then continue if successful.

In this way the real-time robotic control system 150 ensures that safeguards are put in place to improve overall safety and reliability in the custom real-time control of the robots 172*a-n*. Moreover, by providing different levels of error recovery processes to further improve the manner in which the real-time robotic control system 150 responds to errors of different sources and to focus centrally on errors in the custom real-time control information provided by the user, the system facilitates more effective development of custom actions and reactions to be executed by the robot that fit the needs of particular robotic tasks.

Figure 2:
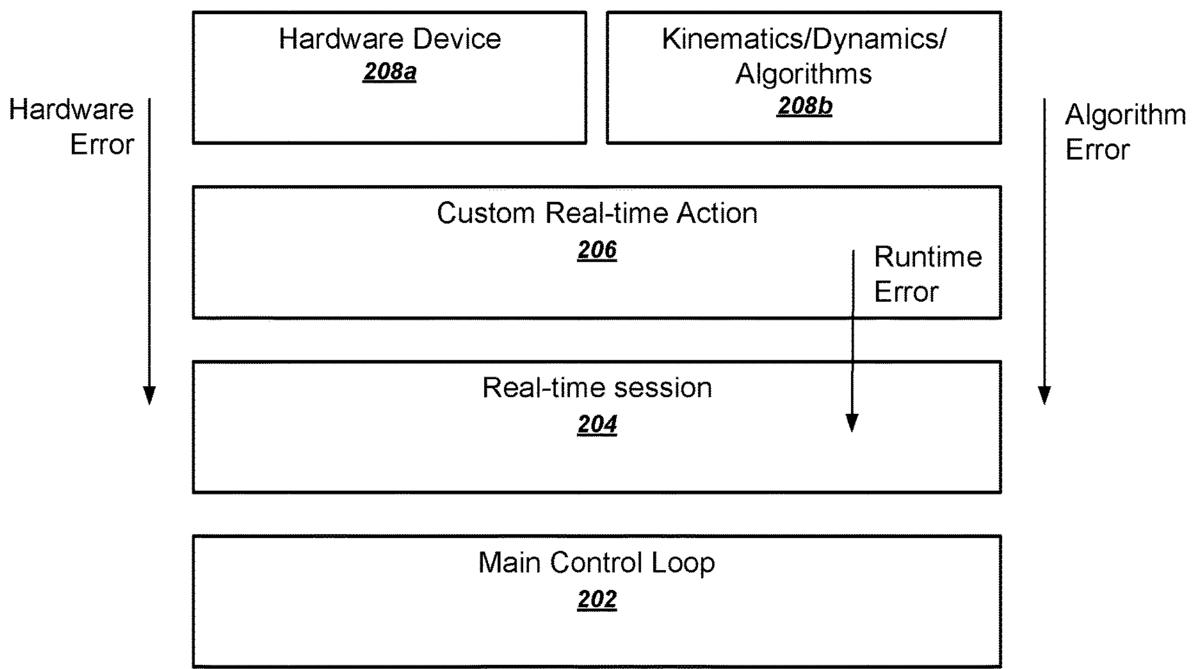
FIG. 2 is an example illustration of a call stack and error propagation for a custom real-time action.

FIG. 2 is an example illustration of a call stack and error propagation for a custom real-time action. Call stack 200 shows an example call stack during the execution of a custom real-time action by the real-time robotic control system. An example way to execute a custom real-time action is described as follows.

First, all hardware devices run a read step. This may be either a direct read from a bus, or inter-process communication read from a separate hardware module that communicates with the bus that is connected to the hardware device.

Second, the main control loop executes the "Sense" functions for all real-time actions of all sessions. In some cases, the hardware device read operations and the "Sense" operations can be parallelized. An action may be configured to catch an error, for example, it may ignore intermittent missing sensor data.

Third, the real-time session handles any errors propagated from the actions, and then evaluate reactions and switch to different actions.

Forth, the real-time session executes all "Control" functions of the real-time actions. In some implementations, actions may be configured to catch some types of errors (for example, generate a fallback motion if inverse kinematics failed), or propagate errors.

Fifth, the main control loop executes the write phase of the hardware devices (which may either directly write to busses or indirectly through inter-process communication to hardware modules). In some cases, the "Control" function calls and hardware write calls can be parallelized.

When executing a custom real-time action in this example way or other ways, the call stack 200 will include multiple stack frames, where each stack frame within the call stack may contain information about the currently executing function of a process. In computing, a function is a segment of code that is executed when the function is called.

Call stack 200 includes a main control loop 202. The main control loop 202 is a software module loop that implements the real-time operation of the real-time robotic control system. Within the software module loop, multiple software modules that reside at the control layer 122*b* or the hardware abstraction layer 122*c* of the real-time robotic control system 150 are executed repeatedly in a predetermined sequence.

The main control loop 202 calls a real-time session 204. The real-time session 204 repeatedly executes a persistent (e.g., continually running) data pipeline between the application layer 122*a* and the control layer 122*b* of the real-time robotic control system 150. The real-time session 204 can preallocate memory and perform data format conversions between non-real-time data formats and real-time data formats. A real-time session allows an application to send actions and reactions in non-real-time, which are subsequently interpreted in real-time in the real-time session, and makes a selection about which hardware to control (exclusively).

The real-time session 204 calls for execution of a custom real-time action 206 to provide the real-time commands to effectuate the custom real-time action 206. As mentioned above, the custom real-time action 206 is a user-specified action defined by custom real-time control code. The functions of a custom real-time action 206 can return a status object, which may either signal "ok" or give a specific error code and, optionally, error message and stack trace.

For example, a runtime error may occur during execution of the custom real-time control code. Alternatively or in addition, an error may occur due to a bug in the custom real-time control code itself. Such errors that occur during the execution of the custom real-time control code will propagate back (i.e., return) to the real-time session 204 which initiated the function call.

The custom real-time action 206 calls both a hardware device control function 208*a* and a kinematics/dynamics algorithms function 208*b*. For example, the hardware device control function 208*a* may be one of the constituent functions of a software module that resides at the hardware abstraction layer 122*c* of the real-time robotic control system 150, and the kinematics/dynamics algorithms function 208*b* may be one of the constituent functions from a robotics library for robot kinematics and dynamics, motion planning, and/or control.

A hardware device control error may occur during execution of the hardware device control function 208*a*. An algorithm error may occur during execution of the kinematics/dynamics algorithms function 208*b*. Just as the runtime errors, such hardware device control errors and algorithm errors will propagate back to the real-time session 204 which initiated the function calls.

Figure 3:
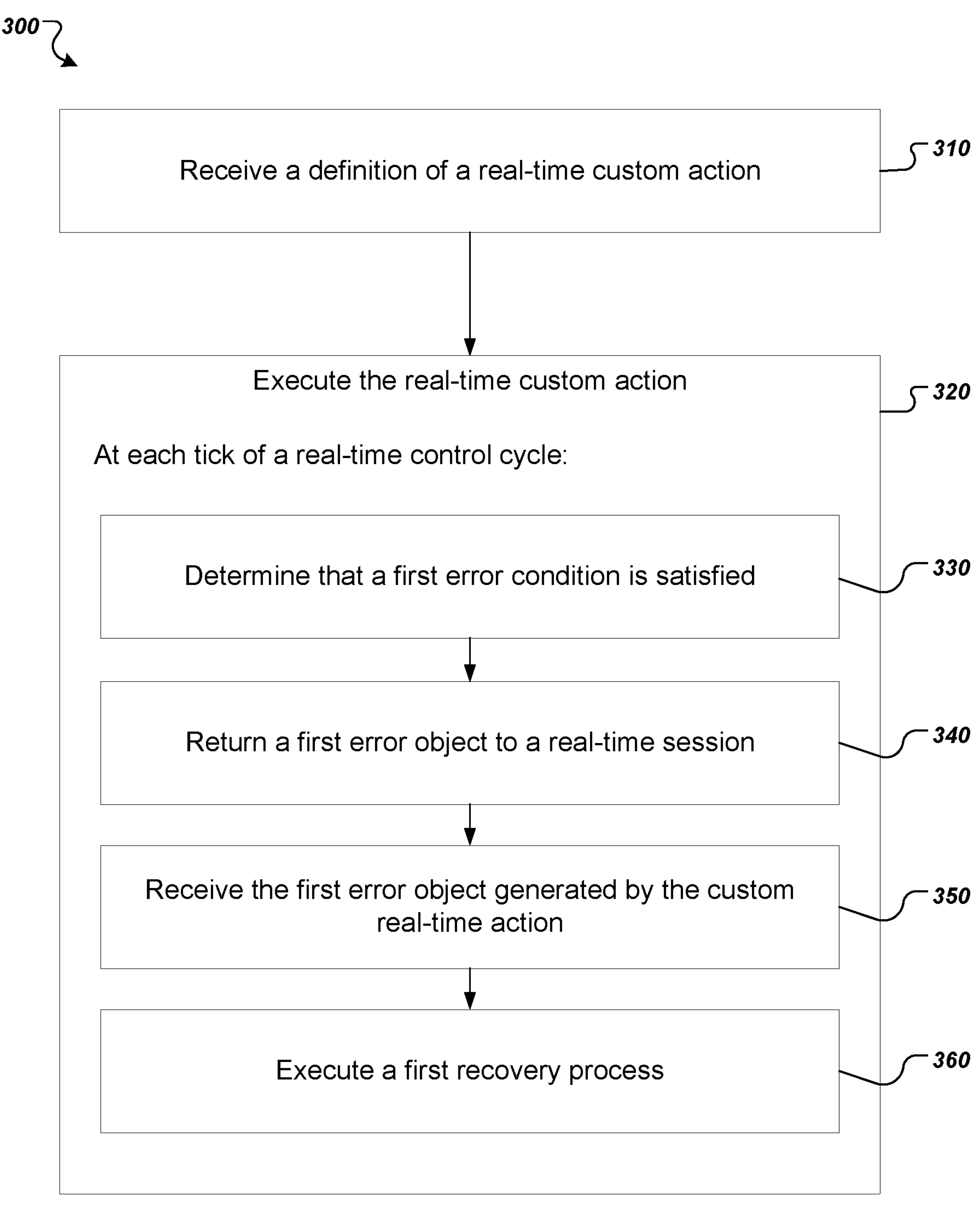
FIG. 3 is a flowchart of an example process for handling an error during execution of a custom real-time action.

FIG. 3 is a flowchart of an example process 300 for handling an error during execution of a custom real-time action. The process can be implemented by one or more computer programs installed on one or more computers and programmed in accordance with this specification. For example, the process can be performed by the real-time robotic control system 150 shown in FIG. 1. For convenience, the process 300 will be described as being performed by a system of one or more computers.

The system receives a definition of a custom real-time action to be performed in real-time by the real-time robotic control system to control a robot (310). The definition of the custom real-time action can generally be provided in the form of source code (referred to herein as "custom real-time control code") expressed in high-level programming languages and, optionally, associated configuration files written as a metadata file. In some cases, the definition of the custom real-time action can be provided by the same entity which runs the real-time robotic control framework, while in other cases, the definition can be provided by a different entity than an entity running or providing the real-time robotic control framework. In those other cases, the different entity can be any entity, such as a third-party developer, with has no preexisting relationship or activity coordination with the operator of the control framework.

In addition to the action definition which may for example include an action id, an action type (e.g., a point to point move), a part (e.g., a robot arm or an end effector), and movement parameters, the custom real-time control code also includes one or more user-defined error conditions that if encountered will cause the robot to perform a recovery process. In some cases, the custom real-time control code further includes one or more user-defined error strings corresponding to each of the one or more error conditions. In particular, the user-defined error conditions designate how the real-time robotic control system should check whether and which errors are encountered without affecting how the custom real-time control code would actually be executed in the real-time robotic control system to control the robot to effectuate the action.

TABLE 1 below lists example error conditions and error strings corresponding to each of the error conditions that are applicable in various distributed systems, including the real-time robotic control system 150 of FIG. 1, which use a Remote Procedure Call (RPC) or another client-server communication protocol.

TABLE 1

| Condition | Code |
|---|---|
| The request succeeded | OK |
| The request was cancelled, typically by the caller | CANCELLED |
| The request parameters would never work | INVALID_ARGUMENT |
| The operation did not complete within the specified deadline | DEADLINE_EXCEEDED |
| The requested entity does not exist | NOT_FOUND |
| The entity being created already exists | ALREADY_EXISTS |
| The caller does not have permission to execute the operation | PERMISSION_DENIED |
| The caller's identity cannot be verified | UNAUTHENTICATED |
| Some resource is exhausted (quota, server capacity, etc) | RESOURCE_EXHAUSTED |
| The system is not in the required state for the operation | FAILED_PRECONDITION |
| The operation was aborted, typically due to a concurrency issue like sequencer check failures, transaction aborts, etc. | ABORTED |
| There was a transient error | UNAVAILABLE |
| The client has iterated too far, and should stop | OUT_OF_RANGE |
| There is no implementation for the requested operation | UNIMPLEMENTED |
| A serious internal invariant is broken (i.e. worthy of a bug or outage report) | INTERNAL |
| Unrecoverable data loss or corruption | DATA_LOSS |
| There is no way to determine a more specific error code | UNKNOWN |

The system invokes execution of the custom real-time code to begin execution of the custom real-time action according to the definition to effectuate real-time operation of the robot (320). In particular, the execution of the custom real-time action by the system involves repeatedly performing following steps 330-360 at each tick of a real-time control cycle.

The system determines, at the custom real-time action, that a first error condition is satisfied (330). An example of an error condition that might be satisfied at the custom real-time action may be a wrong runtime operating environment setup. For example, assuming that the custom real-time action is a trajectory following action that controls a robot arm to follow a trajectory to maintain a threshold distance, e.g., 1 cm, 5 cm, 10 cm, etc., from a surface of an object in the operating environment, and yet the sensor values are null or infinity values, indicating that no such object surface is detected, then an error condition will be satisfied.

The custom real-time action is invoked by a real-time session, which repeatedly executes a persistent data pipeline between the application layer and the control layer of the system. The real-time session, in turn, is invoked by a main control loop, which is a software module loop that implements the real-time operation of the system. At runtime, the system is configured to identify errors occurring during execution of the custom real-time action by repeatedly, i.e., at each tick of the real-time control cycle, comparing a latest operation status of the system, the robot, or both against the one or more error conditions. To obtain the latest operation status of the system, the system can query the operational status of various hardware and software components of the system and determine based on the query results the latest operation status of the system. To obtain the latest operation status of the robot, the system can obtain status messages reported by a controller of the robot and determine based on the obtained status messages the latest operation status of the robot.

As one example for illustration and not limitation, the custom real-time control code may include a case or switch statement structure that employs a status variable (or status expression) which will be tested against a set of case labels. The status variable may be defined as any suitable data type, including as a character, a string, an integer, or a floating point number data type, to name just a few examples, where the values of the status variable can be determined by the system based on the query results, controller reported status messages, or both and possibly additional information gathered from other sources. If a returned value for the status variable matches a first case label among the set of case labels, the system will determine that the first error condition is satisfied, and will correspondingly execute a block of custom real-time control code associated with that first case label which defines how the system should handle the error under this first error condition.

In response, the system returns a first error object from the custom real-time action to the real-time session which invoked the custom real-time action (340). An error object is a notification or report initiated by the custom real-time action to the real-time session that an error matching the first error condition as defined in the custom real-time code has been encountered. In cases where the custom real-time code includes one or more user-defined error strings corresponding to each of the one or more error conditions, the first error object generated by the system can also include the user-defined error strings that correspond to the first error condition. For example, the system can generate the first error object to have any one of the codes listed on the second column of TABLE 1.

The system receives, at the real-time session which invoked the custom real-time action, the error object generated by the custom real-time action (350).

In response, the system executes a first recovery process (360). For example, by parsing a case or switch statement structure which references a status variable, the system can select, from a collection of recovery processes that each correspond to a respective error condition, the first recovery process that corresponds to the first error condition. In particular, executing the first recovery process occurs in a same tick of the real-time control cycle as the real-time custom action returns the first error object.

In some cases, the recovery process performed by the system can include suspending or halting in real-time the execution of the custom real-time action and holding each of one or more robotic components of the robot at a designated recovery position. Such a recovery process can involve taking down the real-time session which invoked the execution of the custom real-time code. Thus, the real-time operation of the system terminates thereafter. In some of these cases, the designated recovery position can be whatever position the robotic component was at during the real-time control cycle when the error occurred, while in others of these cases, the designated recovery position can be a maintenance position that is different from the most recent position of the robot, and the system can switch to execute a predetermined safety action in order to bring the robot to the maintenance position.

In some cases, the recovery process can additionally include generating and displaying, e.g., on a user device, a stack trace and/or error messages to assist in the debugging process to identify problems with the custom code. The stack trace indicates the calling order between the real-time session, the real-time custom action, and the real-time control processes. In some of these cases, after a fix to address the bug in the custom real-time control code is complete, e.g., by the same entity that provided the code with the guidance of the stack trace, the system can resume the execution from the point where it was suspended. The real-time operation of the robot does not have to return to the beginning of the custom real-time action, instead it may resume operation from the point where the first error condition was encountered.

Figure 4:
FIG. 4 is a flowchart of another example process for handling an error during execution of a custom real-time action.
Figure 4:
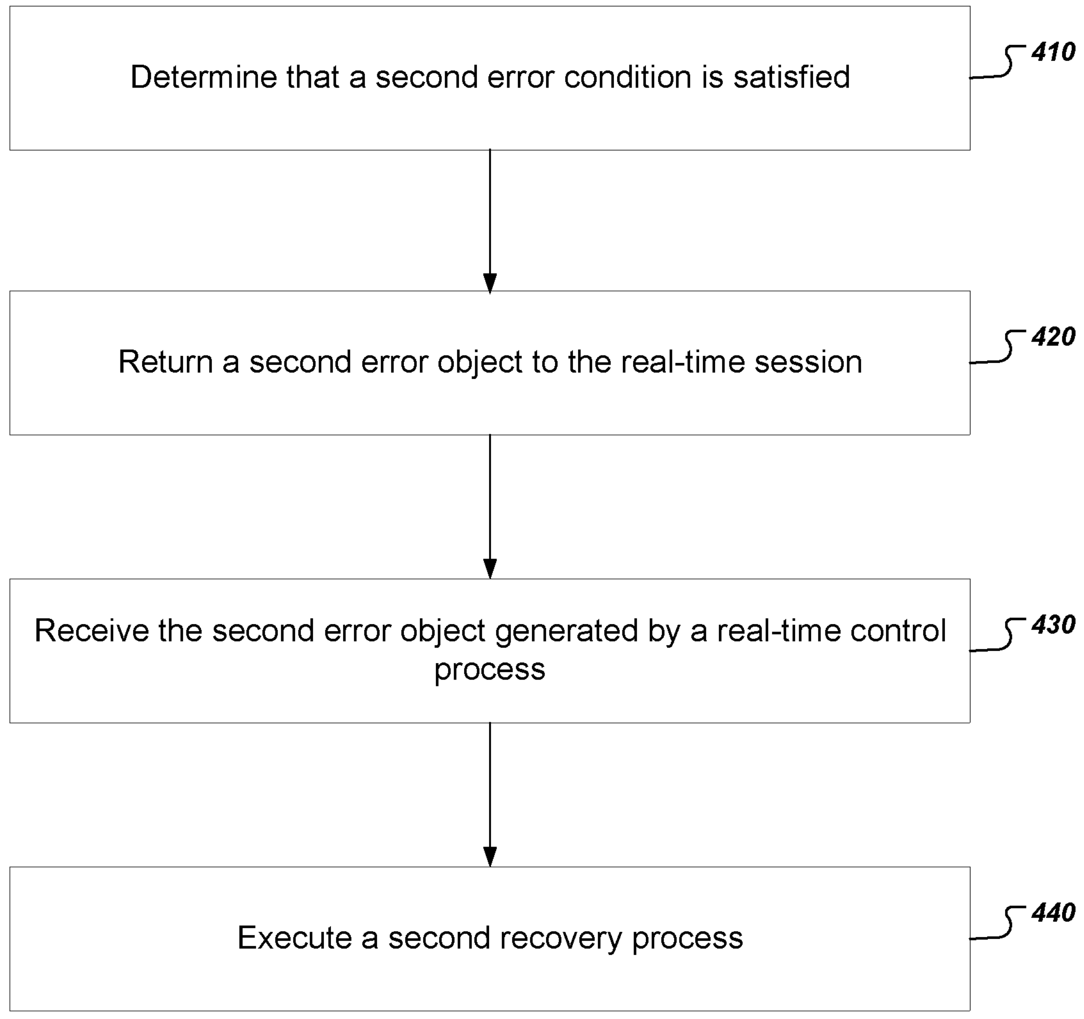

FIG. 4 is a flowchart of another example process 400 for handling an error during execution of a custom real-time action. The process can be implemented by one or more computer programs installed on one or more computers and programmed in accordance with this specification. For example, the process can be performed by the real-time robotic control system 150 shown in FIG. 1. For convenience, the process 400 will be described as being performed by a system of one or more computers.

As similarly described above with reference to FIG. 3, the system can receive a definition of a custom real-time action and execute the custom real-time action according to the definition at each tick of a real-time control cycle to effectuate real-time operation of the robot. The definition of the custom real-time action includes one or more error conditions that if encountered causes the robot to perform a recovery process.

The system determines, at a real-time control process, that a second error condition is satisfied (410). The real-time control process is invoked by the custom real-time action. An example of an error condition that might be satisfied at the real-time control process may be a hardware control error condition. For example, assuming that the real-time control process is an instance of one of the real-time software modules residing within the hardware abstraction layer that performs a hardware control process for a hardware device, e.g., a robot arm, an error condition will be satisfied if the query results of the operation status of the device indicate that the device is currently offline or otherwise unavailable. Another example of an error condition that might be satisfied at the real-time control process may be a kinematics or a dynamics algorithm error condition. For example, assuming that the real-time control process is an instance of a real-time software module that performs an inverse kinematics algorithm, an error condition will be satisfied if the algorithm returns either no solution or an infinite number of solutions when computing the inverse mapping from Cartesian space to joint space.

In response, the system returns a second error object from the real-time control process to the custom real-time action which invoked the real-time control process (420). An error object is a notification or report initiated by the real-time control process to the custom real-time action that an error matching the second error condition as defined in the custom real-time code has been encountered.

The system receives, at the real-time session, the second error object generated by the real-time control process (430).

In response, the system executes a second recovery process (440). Like how the first recovery process can be executed, executing the second recovery process occurs in a same tick of the real-time control cycle as the real-time control process returns the second error object. In some cases, the second recovery process performed by the system can similarly include suspending or halting in real-time the execution of the custom real-time action and holding each of one or more robotic components of the robot at the designated recovery position.

The robot functionalities described in this specification can be implemented by a hardware-agnostic software stack, or, for brevity just a software stack, that is at least partially hardware-agnostic. In other words, the software stack can accept as input commands generated by the planning processes described above without requiring the commands to relate specifically to a particular model of robot or to a particular robotic component. For example, the software stack can be implemented at least partially by the real-time robotic control system 150 of FIG. 1.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an operating environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A method performed by a real-time robotic control system, the method comprising:

receiving, by a non-real-time application layer of the real-time robotic control system, custom real-time control code expressed in a programming language that defines (i) a custom real-time action to be executed in real-time by a real-time control layer of the real-time robotic control system to control a robot, and (ii) one or more error conditions that if encountered causes the robot to perform a recovery process;

executing, by the real-time robotic control system, the custom real-time control code at each tick of a real-time control cycle to effectuate real-time performance of the custom real-time action by the robot, including:

determining, by the real-time control layer executing the custom real-time control code, that a first error condition is satisfied, in response, returning, by the real-time control layer, a first error object from the custom real-time action to a real-time session which executes a data pipeline between the real-time control layer and the non-real-time application layer, selecting, by the real-time session, from a plurality of recovery processes that each correspond to a respective error condition, a first recovery process that corresponds to the first error object received from the real-time control layer, and in response, executing, by the real-time session, the first recovery process.

2. The method of claim 1, wherein executing the recovery process occurs in a same tick of the real-time control cycle as the real-time control layer returning the first error object.

3. The method of claim 1, further comprising:

determining, by the real-time control layer, that a second error condition is satisfied;

in response, returning a second error object from the real-time control layer to the real-time session, receiving, by the real-time session, the second error object generated by the real-time control layer, and in response, executing, by the real-time session, a second recovery process.

4. The method of claim 3, wherein the real-time control layer executes a real-time control process that performs a kinematics or a dynamics algorithm.

5. The method of claim 4, wherein the real-time control process is a hardware control process for a hardware device.

6. The method of claim 4, wherein the real-time control process was invoked by the real-time custom action, and wherein the method further comprises:

generating a stack trace that indicates the calling order between the real-time session, the custom real-time action, and the real-time control process.

7. The method of claim 1, wherein the error conditions are defined relative to a latest operation status of the robot, and wherein determining that the first error condition is satisfied comprises obtaining status messages reported by a controller of the robot.

8. A real-time robotic control system comprising: one or more computers and one or more storage devices storing instructions that are operable, when executed by the one or more computers, to cause the one or more computers to perform operations comprising:

receiving, by a non-real-time application layer of the real-time robotic control system, custom real-time control code expressed in a programming language that defines (i) of a custom real-time action to be executed in real-time by a real-time control layer of the real-time robotic control system to control a robot, and (ii) one or more error conditions that if encountered causes the robot to perform a recovery process;

executing, by the real-time robotic control system, the custom real-time control code at each tick of a real-time control cycle to effectuate real-time performance of the custom real-time action by the robot, including:

determining, by the real-time control layer executing the custom real-time control code, that a first error condition is satisfied, in response, returning, by the real-time control layer, a first error object from the custom real-time action to a real-time session which executes a data pipeline between the real-time control layer and the non-real-time application layer, selecting, by the real-time session, from a plurality of recovery processes that each correspond to a respective error condition, a first recovery process that corresponds to the first error object received from the real-time control layer, and in response, executing, by the real-time session, the first recovery process.

9. The real-time robotic control system of claim 8, wherein executing the recovery process occurs in a same tick of the real-time control cycle as the real-time control layer returning the first error object.

10. The real-time robotic control system of claim 8, wherein the operations further comprise:

determining, by the real-time control layer, that a second error condition is satisfied;

in response, returning a second error object from the real-time control layer to the real-time session, receiving, by the real-time session, the second error object generated by the real-time control layer, and in response, executing, by the real-time session, a second recovery process.

11. The real-time robotic control system of claim 10, wherein the real-time control layer executes a real-time control process that performs a kinematics or a dynamics algorithm.

12. The real-time robotic control system of claim 11, wherein the real-time control process is a hardware control process for a hardware device.

13. The real-time robotic control system of claim 11, wherein the real-time control process was invoked by the real-time custom action, and wherein the method further comprises:

generating a stack trace that indicates the calling order between the real-time session, the custom real-time action, and the real-time control process.

14. The real-time robotic control system of claim 10, wherein the error conditions are defined relative to a latest operation status of the robot, and wherein determining that the first error condition is satisfied comprises obtaining status messages reported by a controller of the robot.

15. A non-transitory computer storage medium encoded with a computer program, the program comprising instructions that are operable, when executed by data processing apparatus, to cause the data processing apparatus to perform operations comprising:

receiving, by a non-real-time application layer of a real-time robotic control system, custom real-time control code expressed in a programming language that defines (i) a custom real-time action to be executed in real-time by a real-time control layer of the real-time robotic control system to control a robot, and (ii) one or more error conditions that if encountered causes the robot to perform a recovery process;

executing, by the real-time robotic control system, the custom real-time control code at each tick of a real-time control cycle to effectuate real-time performance of the custom real-time action by the robot, including:

determining, by the real-time control layer executing the custom real-time control code, that a first error condition is satisfied, in response, returning, by the real-time control layer, a first error object from the custom real-time action to a real-time session which executes a data pipeline between the real-time control layer and the non-real-time application layer, selecting, by the real-time session, from a plurality of recovery processes that each correspond to a respective error condition, a first recovery process that corresponds to the first error object received from the real-time control layer, and in response, executing, by the real-time session, the first recovery process.

16. The non-transitory computer storage medium of claim 15, wherein executing the recovery process occurs in a same tick of the real-time control cycle as the real-time control layer returning the first error object.

17. The non-transitory computer storage medium of claim 15, wherein the operations further comprise:

determining, by the real-time control layer, that a second error condition is satisfied;

in response, returning a second error object from the real-time control layer to the real-time session, receiving, by the real-time session, the second error object generated by the real-time control layer, and in response, executing, by the real-time session, a second recovery process.

18. The non-transitory computer storage medium of claim 17, wherein the real-time control layer executes a real-time control process that performs a kinematics or a dynamics algorithm.

19. The non-transitory computer storage medium of claim 18, wherein the real-time control process is a hardware control process for a hardware device.

20. The non-transitory computer storage medium of claim 18, wherein the real-time control process was invoked by the real-time custom action, and wherein the method further comprises:

generating a stack trace that indicates the calling order between the real-time session, the custom real-time action, and the real-time control process.

21. The non-transitory computer storage medium of claim 15, wherein the error conditions are defined relative to a latest operation status of the robot, and wherein determining that the first error condition is satisfied comprises obtaining status messages reported by a controller of the robot.

22. The method of claim 1, wherein the custom real-time control code further defines a user-defined error string corresponding to each of the one or more error conditions, and wherein returning the first error object from the custom real-time action to the real-time session comprises:

returning the first error object that comprises a first user-defined error string corresponding to the first error condition from the custom real-time action to the real-time session.

23. The real-time robotic control system of claim 8, wherein the custom real-time control code further defines a user-defined error string corresponding to each of the one or more error conditions, and wherein returning the first error object from the custom real-time action to the real-time session comprises:

returning the first error object that comprises a first user-defined error string corresponding to the first error condition from the custom real-time action to the real-time session.

* * * * *